(12) United States Patent
Usher (10) Patent No.: US 8,879,837 B2
(45) Date of Patent: Nov. 4, 2014

(54) METHOD FOR IDENTIFYING PAIRS OF DERIVATIVE AND ORIGINAL IMAGES

(75) Inventor: Mark Usher, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/533,237

(22) Filed: Jun. 26, 2012

(65) Prior Publication Data

US 2012/0328189 A1    Dec. 27, 2012

(30) Foreign Application Priority Data

Jun. 27, 2011  (EP) .................................... 11171465

(51) Int. Cl.
*G06K 9/00* (2006.01)
*G06K 9/54* (2006.01)
*G06F 17/30* (2006.01)

(52) U.S. Cl.
CPC ................................ *G06F 17/30256* (2013.01)
USPC ............ 382/165; 382/168; 382/170; 382/305

(58) Field of Classification Search
CPC .............. G66F 17/30; G06F 17/30256; G06F 17/3025; G06T 5/40; H04N 1/4074
USPC ........... 382/164, 165, 168, 170, 305; 707/705
See application file for complete search history.

(56) References Cited

U.S. PATENT DOCUMENTS

| | | | |
|---|---|---|---|
| 6,594,386 B1 | 7/2003 | Golshani et al. | |
| 6,826,316 B2 | 11/2004 | Luo et al. | |
| 7,467,222 B2 * | 12/2008 | Kacker | 709/232 |
| 7,492,922 B2 * | 2/2009 | Kacker et al. | 382/100 |
| 7,689,544 B2 * | 3/2010 | Koenig | 707/741 |
| 7,856,144 B2 | 12/2010 | Matsushita | |
| 8,224,073 B2 * | 7/2012 | Nuuja et al. | 382/164 |
| 8,437,547 B2 * | 5/2013 | Meiers | 382/168 |
| 8,594,373 B2 * | 11/2013 | Sturzel et al. | 382/103 |
| 8,625,866 B2 * | 1/2014 | Hill et al. | 382/128 |
| 2002/0131641 A1 | 9/2002 | Luo et al. | |
| 2003/0228042 A1 | 12/2003 | Sinha | |
| 2004/0190794 A1 | 9/2004 | Belanger | |
| 2007/0041638 A1 | 2/2007 | Liu et al. | |
| 2007/0127795 A1 | 6/2007 | Lau et al. | |
| 2008/0069456 A1 | 3/2008 | Perronnin | |
| 2008/0267519 A1 | 10/2008 | Monga | |

(Continued)

FOREIGN PATENT DOCUMENTS

| | | |
|---|---|---|
| EP | 1887487 A2 | 2/2008 |
| WO | 03090175 A2 | 10/2003 |
| WO | 2005055138 A2 | 6/2005 |

OTHER PUBLICATIONS

Zhijie Lu, Derivative Image Retrieval, Honours Thesis, Oct. 2005, Abstract, School of Computer Science and Information Technology RMIT University, Melbourne Australia.

(Continued)

*Primary Examiner* — Kanjibhai Patel
(74) *Attorney, Agent, or Firm* — Jordan IP Law, LLC (57) ABSTRACT

The invention provides for a computer-implemented method for detecting one or more archive images matching a search image, each matching archive image being a derivative of the search image or being an original image the search image was derived from accessing a plurality of the archive images. For each of said archive images, a respective archive image histogram may be calculated, wherein each archive image histogram includes a plurality of combination micro-feature values. The archive image histogram may be stored to a database.

15 Claims, 4 Drawing Sheets

(56) References Cited

U.S. PATENT DOCUMENTS

2008/0285855 A1    11/2008    Shiiyama
2010/0153449 A1    6/2010    Baba et al.

OTHER PUBLICATIONS

Intellectual Property Office, Combined Search and Examination Report under Sections 17 and 18(3), 6 pages, Great Britain, Oct. 16, 2012.

Cha Zhang, et al., A Survey of Recent Advances in Face Detection, Technical Report, Jun. 2010, Microsoft Corporation, Redmond, WA, US, 17 Pages.

Archana Sapkota, et al., Face-Grab: Face Recognition with General Region Assigned to Binary Operator, 2010, pp. 82-89, University of Colorado at Colorado Springs, Colorado, US.

Dong Kwon Park, et al., Efficient Use of Local Edge Histogram Descriptor, 2000, pp. 51-54, Department of Electronic Engineering, Dongguk University, Seoul, Korea.

\* cited by examiner

METHOD FOR IDENTIFYING PAIRS OF DERIVATIVE AND ORIGINAL IMAGES

BACKGROUND

Embodiments of the present invention relate to the field of image processing, and more particularly to the field of matching images against each other for identifying images having been derived from an original image by various image manipulation procedures such as cropping, resizing, altering brightness or contrast and the like.

In a number of technical fields, the ability to identify an image as being a derivative of another image may be of great practical importance. For example, the field of data leakage prevention may try to ensure that confidential data, e.g. images comprising personal, medical or otherwise confidential data, is protected from intentionally or unintentionally leaving the company, e.g. by means of an e-mail. Accordingly, it may be advantageous to reliably prohibit the leakage of digital assets of a company such as images of a new product design, company artwork, construction plans, personnel organigrams, and the like.

A common problem of corresponding image processing algorithms is that they can be computationally expensive and may slow down the data exchange over a network. In addition, many of those algorithms have difficulties in accurately identifying an image as a derivative of an original image in case an image manipulation technique or even a combination of multiple image manipulation techniques was applied in order to obtain the derivative image. Such image manipulations may be, for example, adjustments to brightness and contrast, color depth reductions, cropping, removing a copyright notice and so on. A further problem is related to the accuracy of state-of-the-art approaches for identifying derivative images: if an algorithm produces too many false-positive results, it may block important messages from leaving the company although the blocked image was not a derivative of a secret original image. In case an algorithm produces too many false negative results, it cannot reliably protect a company from data leakage.

U.S. Pat. No. 6,594,386 discloses a method for classifying images based on spatial distribution of color and color related features. The disclosed method is based on evaluating pixels of a window of a fixed size. U.S. Pat. No. 6,826,316 discloses a method for automatically providing perceptually significant features of the main subject or background of a first image. The method compares said features of a first image to perceptually significant features of the main subject or background of a second image. The method is based on segmenting images into a plurality of regions of homogeneous color and texture. In U.S. Patent Application Pub. No. 2008/0267519, a method is disclosed for searching an image repository containing a large number of images in order to identify distorted versions of a searched image. U.S. Pat. No. 7,856,144 provides for an image retrieving apparatus for determining a similarity between a feature amount matrix of a query image and a feature amount matrix of an image stored in a storage unit.

BRIEF SUMMARY

Embodiments of the invention may provide for an improved computer-implemented method, a data processing system and corresponding computer-readable storage medium for automatically identifying one or more pairs of original and derivative images, wherein each derivative image was derived from the original image by one or more image manipulation operations.

A "derivative image" according to the common usage of the term may be an image having been derived from an original image by means of one or more image manipulation operations. According to said common usage, the original image is always characterized as the image existing prior than any derivative image. For the purposes of this application, however, chronological aspects shall be neglected. Embodiments of the invention are operable to identify one or more pairs of original and derivative images whereby this detected relation does not necessarily comprise information on chronological aspects of the relationship between said images. This means that within the scope of the present application, the identification of an image as a derivative of another image does not express a particular chronological relationship but rather a degree of similarity indicating that one of said two compared images was derived from the other image by applying one or more image manipulation operations. Accordingly, the terms "original image" and "derivative image" as used herein should be understood as being merely indicative of the fact that two compared images called "original image" and "derivative image" are similar to each other, said similarity being caused by deriving either the derivative image from the original image by applying one or more image modification operations or by deriving the original image from the derivative image by applying said one or more image modification operations on the "derivative image". Accordingly, the terms "original image" and "derivative image" as used herein may be merely used to refer to two different images, one having been derived from the other by one or more image manipulation operations, whereby the 'original image' may, but does not necessarily have to be the original image in the commonly used sense of the word.

An image merely comprising a similar image content like another image is not considered as a derivative. For example, a first and a second image may both depict a horse but may not have been derived from each other by any image manipulation. Accordingly, such two pictures are not considered as a pair of original and derivative images but rather as two independent images comprising one or more similar content objects.

The term 'pixel data' as used herein may refer to any single or composite data value used to specify a precise color of one or more pixels according to a particular color model such as RGB, CMYK, or the like. In case of greyscale images, such data values may relates to the brightness of a particular pixel given a predefined brightness scale.

A "micro-feature" as used herein may be a parameter for which a parameter value can be calculated very quickly by processing pixel data of an image. Such a quick processing operation may be, for example, a comparison operation of two pixel data values.

An "integral image", also known as "summed area table" may be an image wherein any pixel (x, y) has assigned the sum of the pixel data of all the pixels above and/or to the left of said pixel (x, y).

An "image histogram" as used herein may be any data structure created for an image, whereby a plurality of micro-feature values were calculated from said image and whereby the histogram is indicative of the frequency of occurrence of each of said micro-feature values or of particular combinations of said micro-feature values. In particular, the histogram of an image can be indicative of the occurrence frequency of particular combinations of said micro-feature values, also referred to herein as "combination micro-feature values".

A "computer-readable storage medium" may be, for example and without limitation, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

In one aspect, embodiments of the invention relate to a computer-implemented method of detecting one or more archive images matching a search image, each matching archive image being a derivative of the search image or being an original image the search image was derived from, the method comprising accessing a plurality of archive images. For each of said archive images, the method can include computing a respective archive image histogram, each archive image histogram comprising a plurality of combination micro-feature values, and storing said archive image histogram to a database. Additionally, the method can include receiving a search image, computing a search image histogram from said search image, the search image histogram comprising a set of combination micro-feature values, comparing the combination micro-feature values of the search image histogram with the combination micro-feature values of the archive image histograms for identifying one or more candidate archive image histograms, and respectively comparing the one or more candidate archive image histograms with the search image histogram for identifying one or more matching archive images as being a derivative of the search image or as being the original image the search image was derived from.

The features may be advantageous, because when comparing a search image with any of the archive images, at first combination micro-feature values of the respective images are compared in order to determine one or more candidate histograms. The computationally more expensive comparison between two histograms is not executed for the search histogram and each of the archive histograms but only for a small subset of the archive histograms. This can significantly increase the speed of identifying derivative images.

According to embodiments, the micro-features are calculated by converting the image into pixel data according to a color model, whereby each pixel of the image is represented by one numerical value for each color category of the color model, calculating an integral image from the pixel data, comparing a plurality of first data values derived from a plurality of different first sub-sets of the pixel data with a plurality of second data values derived from a plurality of second sub-sets of the pixel data.

The embodiments may be advantageous, as the comparison of micro-features derived from an integral image may provide for a very fast method for comparing images. Calculating each single micro-feature can be executed very quickly, because the calculation is executed on the integral image, not on the image in its original format. By using an integral image, the sum of the pixel data of all the pixels in an arbitrary image area within a current window can be computed very quickly using just four array operations. As a consequence, many thousands of micro-feature values may be calculated very quickly.

According to embodiments, computing an image histogram from an image (e.g., one of the archive images or the search image), comprises the steps of converting the image into pixel data according to a color model, whereby each pixel of the image is represented by one numerical value for each color category of the color model, calculating an integral image from said pixel data, moving a window over the integral image, the movement comprising a plurality of movement steps, whereby the scale of the moving window is different in at least some of the movement steps. For each of the movement steps the method can include using the window of the current step as current window, and calculating a plurality of micro-feature values from the current window, wherein each micro-feature value is the result of a comparison between a first data value derived from the pixel data of a first segment of the current window with one second data value derived from the pixel data of a second segment of the current window, the first and second segment being of equal size and combining the plurality of micro-feature values, thereby forming one combination micro-feature value for the current window. Additionally, the method can include calculating one image histogram for the image, whereby the image histogram is calculated by executing the steps of extracting all unique combination micro-feature values from the formed combination micro-feature values, and determining an occurrence frequency for each unique combination micro-feature value within all combination micro-feature values calculated for said image.

The features may be advantageous, because they may allow to highly accurately identify images having been derived from an original image by a variety of image modifications or combinations thereof, including adjustments to brightness and contrast, color depth reduction, additive noise, and blur. Also complex image manipulation operations such as oil paint effect, radial blurs, zoom blurs, pixelization, stone effect, cylindrical wave effects, image resizing, image cropping, removal of parts of the image, e.g., logos and copyright notices, and the like may be covered and image derivates generated by one or more of said complex manipulation operations may be identified.

In a further advantageous aspect, the embodiments may enable the identification of image derivatives by evaluating a huge collection of archive images very quickly. For example, an implementation of one embodiment running on an IBM ThinkPad laptop was operable to search a database comprising 500,000 archive images in less than 0.2 seconds.

In a further advantageous aspect, the usage of a window of varying size may provide for a particularly robust and accurate method for identifying derivative images. By calculating combination micro-feature values for multiple windows of different scales, the method becomes more robust against image manipulations relating to increasing or decreasing the image size.

Due to the short calculation time for each single micro-feature value, a large plurality of micro-feature values may be calculated in fractions of a second. The robustness of the method may thereby further be increased.

An "archive image" may be any image stored in a data repository (e.g., a relational database), and/or may be an image stored in memory. For example, a database may comprise a set of archive images which have to be protected from leaking outside a company. For each of the archive images, a pre-calculated archive histogram may be stored to the same database. Each of the archive images may be considered as "original image". The search image may be compared against the archive image for evaluating whether the search image is a derivative image of any of the "original" images in the image archive. A pair of "matching" images may be any pair of images whose corresponding image histograms were compared and reached a minimum degree of similarity, the similarity criteria depending on the particular comparison algorithm used.

According to further embodiments of the invention, the image archive comprises a plurality of images considered as potential derivatives of an original image, whereby the image provided as the search image is considered as original image. For example, in order to determine whether a company offering an archive of stock images has violated the copyrights of the owner of a particular original image, the owner may use his original image as search image for searching said image stock for one or more matches.

According to some embodiments, each "current window" is characterized by a unique combination of window size and window position within the integral image.

Depending on the embodiment, the individual search image may be selected and/or loaded by a user (e.g., via a graphical user interface), or it may be automatically provided by an application program. Such an application program may be a filtering software which automatically identifies images which are scheduled for being transferred to a destination outside a particular IT infrastructure considered as secure (e.g., the IT infrastructure of a particular company or department).

In a further advantageous aspect, embodiments of the invention are able to process and compare images of a variety of different image formats such as JPEG, gif, TIF, Windows bitmap and/or vector graphic formats by converting images of the formats into an integral image and using the integral image as basis for the succeeding processing steps.

According to some embodiments, the color model is an RGB color model. Using a red green blue color model may be advantageous, because it does not depend on computer-system dependent criteria such as the used printing color schema or screen settings.

According to some embodiments, the current window is a square and the compared first and second segments either consist of a first and a second half or consist of a first and a second quadrant of said current window.

According to some embodiments, the first and the second segments are selected from a group of first and second segments consisting of the upper half and the lower half of the window, the window being divided horizontally, the left half and the right half of the window, the window being divided vertically, the right lower quadrant and the left upper quadrant of the window, the window being divided vertically and horizontally, and the left lower quadrant and the right upper quadrant of the window, the window being divided vertically and horizontally.

The embodiments may be advantageous, because by respectively comparing a plurality of different window sections (e.g., window halves and window quadrants generated by horizontally and/or vertically dividing the current window), the method becomes more accurate. Comparing window sections of different locations within the current window ensures that the information contained in multiple different relationships between different parts of the window is taken into account.

According to some embodiments, the color model is an RGB color model. Each micro-feature value is calculated by a comparing function that compares the first and the second data value. Thereby, the first data value is the sum of the RGB-values of a first color of all pixels of the first segment, the first color being red, green or blue. The second data value is the sum of the RGB-values of a second color of all pixels of the second segment, the second color being red, green or blue. At least six different micro-feature values are calculated based on a comparison of at least three pairs of first and second colors evaluated on at least two pairs of first and second segments, whereby said at least three pairs of first and second colors comprise red and red, green and green, and blue and blue. The at least two pairs of first and second segments thereby comprise the right lower quadrant and left upper quadrant, and the left lower quadrant and right upper quadrant.

According to some embodiments, in addition or alternatively to the at least six micro-features, at least one grey-scale micro-feature is calculated. The first data value is a grey value calculated by summing up all RGB-values for the colors red, green and blue of all pixels of the first segment, and dividing said sum by three. The second data value is a background value calculated by determining the number of pixels within the second segment and multiplying said number by 128. Each of the at least one grey-scale micro-features is calculated based on a comparison of the grey value and the background value, the comparison being executed for a pair of first and second segments being selected from the group comprising: the left upper quadrant and the left upper quadrant; the right upper quadrant and the right upper quadrant; the left lower quadrant and the left lower quadrant; and the right lower quadrant and the right lower quadrant.

According to some embodiments, the comparison function for comparing the first data value ARG1 and the second data value ARG2 is selected from the group comprising: ARG1>ARG2; ARG1×c1>ARG2, wherein c1 is a constant larger than 1; ARG1×c2>ARG2, wherein c2 is a constant larger than 0 and smaller than 1; ARG1+c3>ARG2, wherein c3 is a constant; (ARG1×c1)+c3>ARG2; and (ARG1×c2)+c3>ARG2.

Using a comparison function such as ARG1>ARG2 may be advantageous, because the result can be calculated very quickly. Using additional constants such as c1, c2 and/or c3 may be advantageous, because said constants may allow adapting the comparison function according to the particular needs of a company in respect to speed and accuracy. It may be also possible (e.g., by adapting c3), to specify thresholds and thereby modify the sensitivity of the image identification method.

In a further aspect, calculating micro-feature values as the result of a comparison of two pixel data values may be advantageous, because they do not represent absolute color values but rather represent the difference between the compared two segments. In this manner, the micro-features are robust against changes in brightness and contrast relative to the original image.

According to some embodiments, the window is a square and executing the plurality of movement steps comprises specifying a proportion factor SR, SR being a value between zero and one, specifying a shifting factor DR, determining a variable MWS as the length of the shortest side of the integral image, determine the height and width IWS of an initial window $w_1$ as IWS=MWS×SR, by choosing a starting point (e.g., the left upper corner), of the image as the left upper corner of the initial window $w_1$, after having calculated the combination micro-feature values for the initial window $w_1$, shifting the window DX pixels horizontally and/or vertically until every pixel of the integral window was covered by at least one of the windows, wherein DX=IWS×DR, whereby upon each window movement a combination micro-feature value is calculated for the corresponding current window, after having executed the choosing and calculating steps, increasing the height and width of the window by multiplying the IWS value of the window used in the previous choosing and calculating steps by a scale factor SF, such that IWS'=IWS×SF, and repeating all steps until the height and width of the increased window exceeds MWS.

The embodiments may be advantageous, because by moving the window horizontally and/or vertically across the whole integral image until each single pixel is covered at least once by a current window guarantees that all the information contained in each pixel of the integral image is considered. Repeating said steps for windows of a modified scale may increase the robustness against image manipulation operations being based on a rescaling of the original image. According to some embodiments, the following values were observed to be particularly advantageous: SR=3/16, DR=1/3 and SF=$2^{0.25}$. According to some embodiments, the initial width and height of the initial window $w_1$ is four pixels respectively. A 4×4 pixel window may be the smallest possible value. Depending on the embodiment, initial windows of greater size may be used (e.g., 8×8 px, 16×16 px, 24×24 px, and the like).

According to embodiments, a unique list of combination micro-feature values derived from all archive images in the database is stored in an index, whereby each entry of the index references the archive image identifiers of those archive images whose corresponding histogram comprise the combination micro-feature value. In addition, each archive image is stored in a particular position within an array in the database, whereby the position is identical to the primary key used for storing the corresponding archive image histogram. The embodiments may be advantageous as they may allow for a very fast access of the database for retrieving and comparing archive image histograms.

According to some embodiments, comparing the combination micro-feature values of the search image histogram with the combination micro-feature values of the archive image histograms comprises: storing the individual combination micro-feature values of each archive image histogram in an index of the database, the index comprising a unique set of combination micro-feature values having been calculated for said archive image. Each index entry may reference one or more identifiers of archive image histograms that comprise a combination micro-feature value being identical to the referencing index entry; using each of the combination micro-feature values of the search image histogram as keys on said index for retrieving archive image micro-feature values being identical to any of said search image combination micro-feature values; determining all archive image histograms referenced by said retrieved archive image micro-feature values; assigning to each of said determined archive image histograms a count score value CSV, the count score value being indicative of the number of retrieved archive image combination micro-feature values referencing the identifier of said archive image histogram; and reading all archive image histograms whose count score value exceeds a key threshold KT as the candidate archive image histograms. According to some embodiments, a key threshold KT=40 is used.

The embodiments may be advantageous, because each combination micro-feature value is a highly specific descriptor of each current window, because for each combination micro-feature value a huge set of values is theoretically possible. For example, in case twenty-four micro-features are calculated for each current window, each micro-feature being a binary data value '0' or '1', then $2^{24}$ different combination micro-feature values are theoretically possible for each particular current window. According to some embodiments, 10,000 to 100,000 movement steps are executed per integral image. As each movement step corresponds to one current window, a corresponding number of 10,000 to 100,000 combination micro-feature values are calculated for each archive image. Therefore, typically only a small fraction of all theoretically possible combination micro-feature values are actually calculated for each particular archive- or search-image. A histogram may include a unique list of actually calculated combination micro-feature values for a particular integral image and can include, for each of the unique combination micro-feature values, a frequency value. The frequency value may indicate how often the unique combination micro-feature value was calculated for said integral image.

An example of a combination micro-feature value index whose 3 entries respectively reference one or more identifiers of archive image histograms is given in the following:

| Combination micro-feature ID/value | Histogram ID list |
| --- | --- |
| 2324211 | 13, 244, 257, 2993, 3995, 9222 |
| 255 | 13, 553, 4412, 9222 |
| 31134 | 13, 33, 6999, 8800, 9941 |

According to the example given in the table, the count score value of the histogram with ID=13 would be '3', that of histogram ID=9222 would be '2' and the count score values of all other archive image histograms would be 1. Assuming that the key threshold value is 1.5, only the archive image histograms with identifiers 13 and 9222 are read from the database and may be used e.g. as candidate image histogram.

According to some embodiments, the count score value is calculated for each of the archive image histograms by executing the following steps: creating a data structure (e.g., an array), having as many elements as there are archive images in the database. All elements of the array may be initially set to '0'. For each combination micro-feature value of the search image histogram, a lookup for all archive image histogram IDs can be made which are referenced by the combination micro-feature value stored in the index. For each search image combination micro-feature value and for each looked-up archive image identifier, the value stored in the data structure element at a position $p_u$ is incremented by one, whereby the position $p_u$ is the histogram identifier of the looked-up archive image histogram. For example, if histogram of ID=244 is referenced by a particular search image combination micro-feature value, the $244^{th}$ element of said data structure is incremented by one. The embodiment may be advantageous, as incrementing the counts for calculating the count score of each archive image can be executed very quickly.

According to some embodiments, respectively comparing the one or more candidate archive image histograms with the search image histogram comprises, for each of the candidate archive image histograms, the following steps, calculating a distance score value DSV, the DSV indicating the distance between the candidate archive image histogram and the search image histogram, whereby the distance score value may be calculated (e.g., based on the Manhattan distance, the Euclidian distance or the like), determining all archive image histograms whose distance score is lower than a distance threshold DT and using the determined archive image histograms as candidate image histograms, mapping the count score value CSV to a mapped count score value MCSV, the MCSV lying within the inclusive range 0.5-1, whereby KM is a predefined constant representing the maximum possible CSV value of all candidate archive image histograms. The MCSV may be calculated as: MCSV=0.5+min(0.5, ((CSV−KT)/(KM−KT)), mapping the distance score value DSV to a mapped distance score value MDSV, the MDSV lying within the inclusive range 0.5-1, whereby DM is a predefined constant representing the maximum possible DSV value of all candidate archive image histograms and wherein MDSV=0.5+min(0.5, ((1−DSV)−(1−DT))/(DM−(1−DT))), calculating a final score SC=(MCSV+MDSV)/2, and identifying the one or more archive images if the final score value SC exceeds a cutoff threshold.

Calculating the final score for identifying one or more images as derivatives images as described above may be advantageous, because said complex calculation steps are executed only on a subset of the archive images and corresponding archive image histograms, thereby saving valuable time and processing power. At the same time, said processing steps may provide for a particularly accurate determination of the distance of a searched image and a plurality of archive images in respect to a set of micro-features having been determined as particularly significant for identifying one or more pairs of original and derivative images.

According to some embodiments, the following values are used: key threshold KT=40; distance threshold DT=0.052; KM being a predefined maximum count score value CSV used for normalization purposes=2×KT; DM being a predefined maximum distance score value DSV used for normalization purposes=1.0; cutoff threshold CT=0.65.

According to the above mentioned example, the calculated count score value of archive image with ID=13 was 3, the CSV value of archive image 9222 was 2. Assuming that the distance score value DSV between the archive image histogram 13 and the search image histogram was calculated to be 0.027 while the DSV between the archive image histogram 9222 and the search image histogram was calculated to be 0.058, and assuming the distance threshold DT was specified to be 0.04, only archive image histogram 13 will be considered as a candidate match and will be identified as derivative image provided that in addition the calculated final score value exceeds the cutoff threshold.

According to some embodiments, each image histogram is normalized and thresholded before the distance score values are calculated by executing the following steps: calculating the sum of all frequency values for all unique combination micro-features of said histogram; dividing each frequency value of one of the combination micro-feature values of said histogram by said sum, so that the sum of all normalized frequency values of said histogram is one; and removing all combination micro-feature values from said histogram if their respective normalized frequency value is below a frequency threshold HT.

According to some embodiments, a frequency threshold HT of 0.0025 has been shown to yield accurate results. The features may be advantageous, because the number of combination micro-feature values which are stored to the database (e.g., to an index of combination micro-feature values), is reduced. This reduces the size of the index and accelerates the image identification.

According to some embodiments, the key threshold value is not a constant but is rather calculated using $KT=K_N \times K_R$, whereby $K_N$ is the number of combination micro-features contained in the evaluated image histogram. $K_R$ may be a predefined scale factor (e.g., 0.7). The embodiments may be advantageous for the following reasons: in rare cases, an image histogram will comprise fewer combination micro-feature values than the key threshold KT, with the consequence that the count score value of the histogram will never exceed the key threshold. This problem may be circumvented by using the dynamically calculated key threshold value.

According to some embodiments, each micro-feature value is a zero or one value. Each combination micro-feature value may be stored in the form of a 32-bit integer or a 64-bit long data type in the database, whereby each micro-feature value is stored at a bit position within the data structure, the position being particular to one type of micro-feature. The features may be advantageous, because instead of creating additional, top-level data objects, the inherent structure of basic data-types such as integer and long supported by almost all current relational database systems are used. This can save storage volume and save additional time when reading said combination micro-feature values from the database into memory.

According to some embodiments, the histogram is stored in a sparse format wherein only the combination micro-feature values actually found are stored. Such a sparse format can be, for example, a hash map, a binary tree or the like, wherein each found combination micro-feature value has assigned a frequency value.

According to some embodiments, the method further comprises the step of specifying a plurality of different reference points within the integral image. Thereby, one image histogram is calculated for each of said reference points according to the steps of anyone of the embodiments of the computer implemented method described above. Creating an image histogram for each of the reference points comprises the following steps to be executed in addition to the above mentioned steps for calculating an image histogram, determine a normalization factor T, T being calculated as the Manhattan distance between the top left corner and the bottom left corner of the integral image. For each of the movement steps, the method may include determining a center point Z of the current window and calculating the Manhattan distance $d_{RP,Z}$ between said center point Z and the reference point RP, and calculating a weight $we=1.0-d_{RP,Z}/T$. After having calculated all combination micro-feature values for the image histogram, for each of the calculated combination micro-feature values of the histogram, a weighted frequency value is calculated by summing up all weights having been calculated for the combination micro-feature values of all respective current windows of the image histogram.

The weighted frequency values may be used for calculating the distance score values. As a result, instead of a single histogram as many histograms are generated as reference points have been specified. Each histogram is therefore positively biased towards the area of the integral image centered around the reference point of the respective histogram.

The embodiments may be advantageous, because they may provide for a method which is particularly robust in respect to identifying images which have been cropped off from an original image. This is due to the fact that the micro-features are weighted based on the spacial distance between the center of a current window used for calculating said micro-feature and the reference point used for calculating the respective histogram. Window areas lying far apart from a particular reference point contribute less to the final image histogram. Therefore, a reference point-focused histogram matches a cropped image comprising the area of the original image particularly well.

According to some embodiments, each of the archive image histograms is stored in the database in the form of an array, the dimension of the array being equal to the number of archive images, wherein the position of each image histogram within the array is used as a unique identifier of the image histogram and as unique identifier of the corresponding archive image. In case a plurality of different reference points was specified, each array element comprises one stacked archive histogram. A stacked archive histogram can be a single data structure comprising one archive image histogram, also referred to as "sub-histogram", for each of the different reference points, the stacked archive histogram allowing individualizing each of its archive image histograms.

The embodiments may be advantageous, because in case a candidate archive image histogram at a particular array element position p was identified as a matching image, the element position p can immediately be used as a key for retrieving the archive image corresponding to said matching archive image histogram. Thereby, time for retrieving the matching archive images is saved.

In order to calculate the distance between a first and a second stacked histogram, according to embodiments each individual sub-histogram of the first stack histogram is compared against every sub-histogram of the second stack histogram, and the smallest distance is taken as the distance between the first and the second stacked histograms.

In a further aspect, the invention relates to a computer-system for detecting one or more archive images matching a search image, each matching archive image being a derivative of the search image or being an original image the search image was derived from. The computer-system may include a processor and a computer-readable, non-transitory storage medium. The storage medium may include computer-interpretable instructions that, when executed by the processor, cause the processor to perform the steps according to anyone of the embodiments of the computer implemented method described above.

In a further aspect, the invention relates to a computer-readable, non-transitory storage medium. The storage medium may include computer-interpretable instructions that, when executed by the processor, cause the processor to perform the steps according to anyone of the embodiments of the computer implemented method described above.

As will be appreciated by one skilled in the art, aspects of the present invention may be embodied as a system, method or computer program product. Accordingly, if not explicitly stated otherwise, aspects of the present invention may take the form of an entirely hardware embodiment, an entirely software embodiment (including firmware, resident software, micro-code, etc.) or an embodiment combining software and hardware aspects that may all generally be referred to herein as a "module" or "system". Any combination of one or more computer-readable medium(s) may be utilized.

BRIEF DESCRIPTION OF THE DRAWINGS

The above and other items, features and advantages of the invention will be better understood by reading the following more particular description of embodiments of the invention in conjunction with the figures wherein.

DETAILED DESCRIPTION OF EMBODIMENTS OF THE INVENTION

Embodiments of the invention are described herein after by way of examples with reference to the accompanying figures and drawings.

Figure 1A:
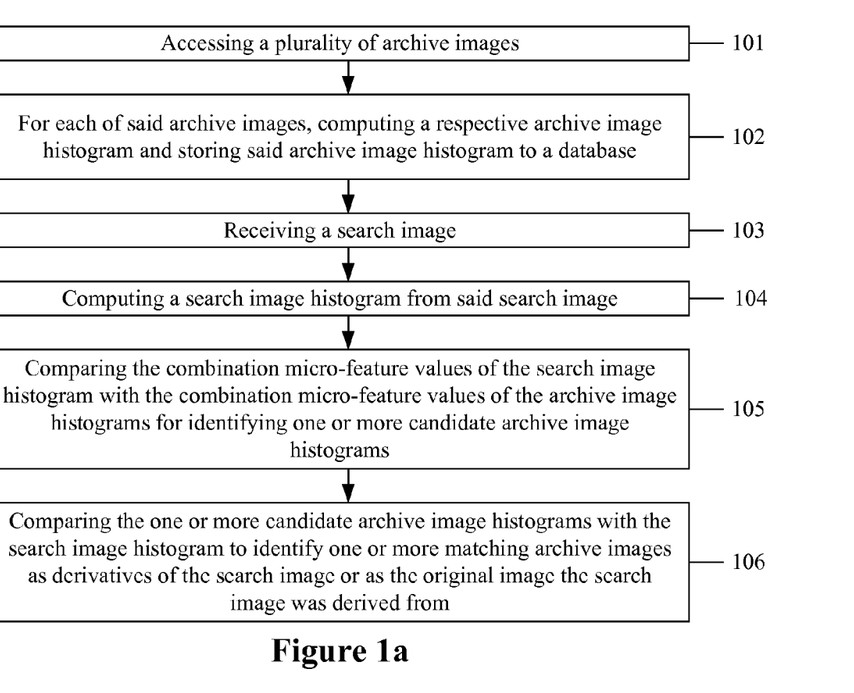
FIG. 1a is a flowchart of an example of a method of detecting images having been derived from an original image by calculating image histograms.

FIG. 1a is a flowchart of a method of detecting images having been derived from an original image by calculating image histograms. In step 101, a plurality of archive images is accessed. For example, a plurality of images may be stored in a relational database. For each of said archive images, a respective archive image histogram is calculated in step 102 and said calculated archive image histogram is stored in association with the respective archive image in the database. Step 102 may be executed once when the image archive is created and may be executed incrementally for all new archive images added to the database later on. Alternatively, step 102 may be executed for all images in the database at a regular basis. In step 103, a search image is received (e.g., from an e-mail-filtering application program and/or from a user selecting a particular image via a graphical user interface). A search image histogram is calculated in step 104 from the received search image. Each image histogram may include a set of unique combination micro-feature values, each unique combination micro-feature value having assigned a frequency value being indicative of the occurrence frequency of the respective combination micro-feature value within the totality of all calculated for the image. In step 105, the combination micro-features of the search image histogram are compared with the combination micro-feature values of each of the archive image histograms in order to identify one or more candidate archive image histograms. Comparing combination micro-feature values can be executed highly efficiently, because according to preferred embodiments the comparison is based on determining, for each combination micro-feature value of the search image histogram, whether an identical combination micro-feature value of an archive image histogram exists within an index of unique combination micro-feature values in the database. Retrieving an identical match within an index can be executed very quickly. A list of matching combination micro-feature values of one or more archive image histograms is used for identifying one or more candidate archive image histograms. In step 106, the determined one or more candidate archive image histograms are compared with the search image histogram in order to identify one or more archive images corresponding to one or more of the candidate archive image histograms as derivatives of the search image or vice versa. Typically, step 106 makes use of a computationally more expensive distance-based comparison of image histograms.

According to some embodiments, steps 101-106 may be implemented by a plug-in of an e-mail client program that automatically evaluates all images which are to be sent via a particular e-mail account.

Figure 1B:
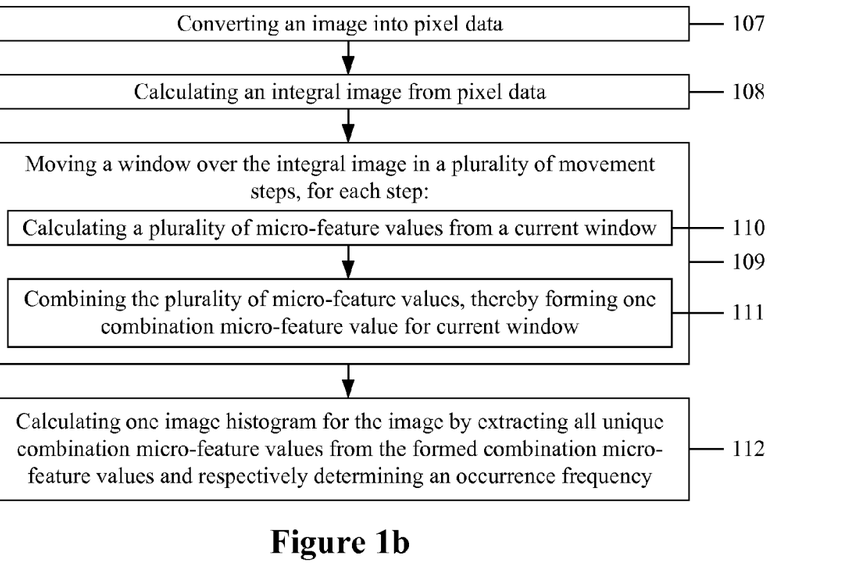
FIG. 1b is a flowchart an example of a method of calculating an image histogram in greater detail.

FIG. 1b is a flowchart depicting the calculation of an image histogram in greater detail. In order to calculate an image histogram for a particular image, the image is converted in step 107 into pixel data. For example, an image received (e.g., in the JPEG or TIF format is transformed such that for each pixel of said image), and for each of the colors red, green and blue, a numerical value between zero and 255 is specified according to the RGB color model. In step 108 an integral image is calculated from the pixel data. This is achieved by calculating, for each pixel within the received image, the sum of all pixel data of all pixels lying above and/or to the left of said pixel, whereby the calculation is executed for each color of the used color model separately. Accordingly, each pixel of the integral image has assigned one sum for all red pixel data values lying above and/or to the left of said pixel. In addition, said pixel has respectively assigned one sum for all green pixel data values and one sum for all blue pixel data values of all pixels lying above and/or to the left of the pixel. In the succeeding step 109, a window is moved over the integral image in a plurality of movement steps, whereby for each movement step a plurality of micro-feature values is calculated for the current window in step 110. In step 111, the plurality of micro-feature values having been calculated for the current window is combined and a combination micro-feature value is thereby formed for the current window. After having calculated the combination of micro-feature values for each of the current windows/movement steps, an image histogram is calculated for the image in step 112 by extracting all unique combination micro-feature values from the totality of formed combination micro-feature values and by respectively determining an occurrence frequency value. The method steps 107-112 are respectively used for calculating the archive image histograms and the search image histogram in the method steps 102 and 104.

Figure 2:
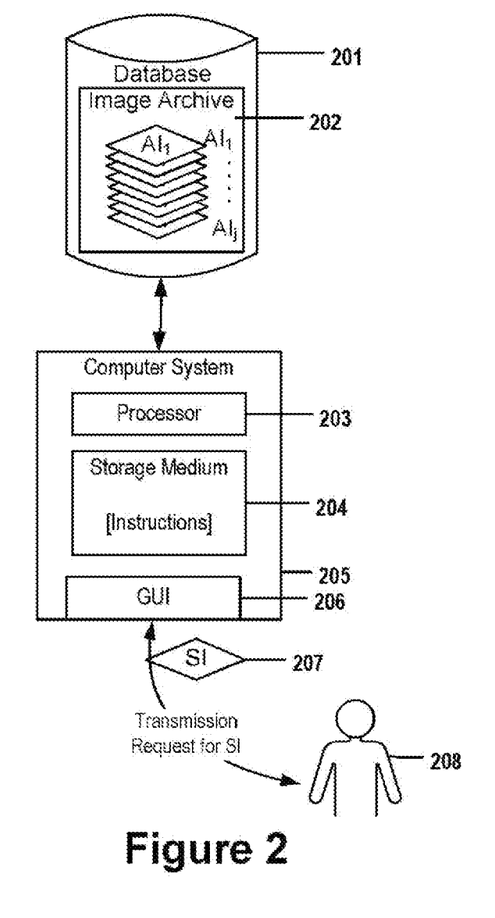
FIG. 2 depicts an example of a computer system operatively coupled to an image archive database.

FIG. 2 depicts a computer system 205 operatively coupled to an image archive database (201). The database includes an image archive 202 which comprises a plurality of archive images $AI_1, \ldots, AI_j$. The computer system includes a processor 203 and a computer readable, non-transitory storage medium 204. The storage medium includes instructions which, when executed by the processor, cause the processor to execute the method for identifying one or more pairs of a derivative and original image according to any of the above embodiments. A user 208 is operable to transmit a request via graphical user interface 206 to determine whether a search image 207 is so similar to any of the archive images that it has to be considered as a derivative of the image or, vice versa, that the one or more similar archive images are derivatives of the search image.

Figure 3:
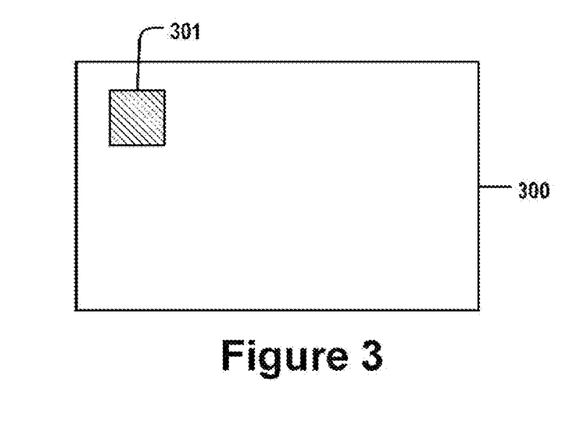
FIG. 3 depicts an example of an integral image comprising a current window.

FIG. 3 depicts an integral image 300 comprising a current window 301. The current window 301 is moved in a plurality of movement steps across the integrating image. For each of the movement steps, the respective current window is segmented into one or more pairs of first and second segments which are depicted in greater detail in FIG. 4.

Figure 4:
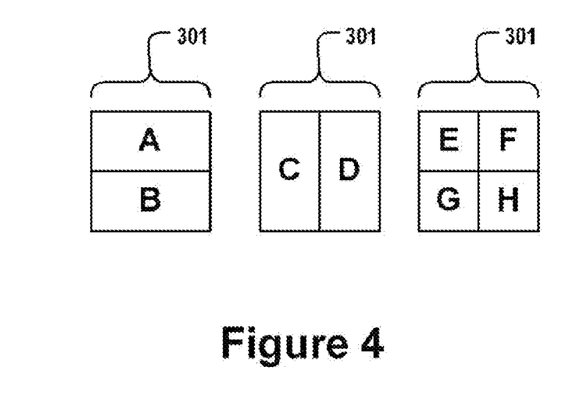
FIG. 4 depicts an example of three different ways of dividing the current window into segment pairs.

FIG. 4 depicts three different ways of dividing the current window into segment pairs. A horizontal division yields a first segment A and a second segment B. A vertical division yields a first segment C and a second segment D, whereby the segments A, B and C, D respectively are non-overlapping halves of the current window. A combination of the horizontal and vertical division yields two pairs of segments, the first pair comprising quadrant H and E, the second pair comprising quadrant G and F. Each micro-feature value is the result of the comparison of color-specific pixel data of the first and the second segment using in-color comparison and/or cross-color comparison. In-color comparison may be a comparison of the pixel data of the first and the second segment regarding the same color (e.g., red versus red, or blue versus blue). Cross-color comparison relates to comparing the pixel data of the first and the second segment, whereby the pixel data of the first segment is derived from a different color than the pixel data of the second segment (e.g. red versus blue, or blue versus green).

According to some of the embodiments depicted in FIG. 4, 24 color-based micro-feature values are calculated by executing a comparison function comp($ARG1_{COLOR,SEGMENT1}$, $ARG2_{COLOR,SEGMENT2}$). The comparison function compares a first input argument ARG1 with a second input argument ARG2, wherein each input argument $ARG1_{COLOR,SEGMENT}$ consists of the sum of all pixel data of the respective color COLOR has been derived from a respective window segment SEGMENT. For each current window, the micro-features $f_0, \ldots, f_{23}$ are calculated such that, $f_0$ value=comp($ARG1_{RED,UPPER\_WINDOW\_HALF}$, $ARG2_{RED,LOWER\_HALF}$),
$f_1$ value=comp($ARG1_{GREEN,UPPER\_HALF}$, $ARG2_{GREEN,LOWER\_HALF}$),
$f_2$ value=comp($ARG1_{BLUE,UPPER\_HALF}$, $ARG2_{BLUE,LOWER\_HALF}$),
$f_3$ value=comp($ARG1_{RED,UPPER\_HALF}$, $ARG2_{GREEN,LOWER\_HALF}$),
$f_4$ value=comp($ARG1_{RED,UPPER\_HALF}$, $ARG2_{BLUE,LOWER\_HALF}$),
$f_5$ value=comp($ARG1_{GREEN,UPPER\_HALF}$, $ARG2_{BLUE,LOWER\_HALF}$),
$f_6$ value=comp($ARG1_{RED,LEFT\_HALF}$, $ARG2_{RED,RIGHT\_HALF}$),
$f_7$ value=comp($ARG1_{GREEN,LEFT\_HALF}$, $ARG2_{GREEN,RIGHT\_HALF}$),
$f_8$ value=comp($ARG1_{BLUE,LEFT\_HALF}$, $ARG2_{BLUE,RIGHT\_HALF}$),
$f_9$ value=comp($ARG1_{RED,LEFT\_HALF}$, $ARG2_{GREEN,RIGHT\_HALF}$),
$f_{10}$ value=comp($ARG1_{RED,LEFT\_HALF}$, $ARG2_{BLUE,RIGHT\_HALF}$),
$f_{11}$ value=comp($ARG1_{GREEN,LEFT\_HALF}$, $ARG2_{BLUE,RIGHT\_HALF}$),
$f_{12}$ value=comp($ARG1_{RED,RIGHT\_LOWER\_QUADRANT}$, $ARG2_{RED,LEFT\_UPPER\_QUADRANT}$),
$f_{13}$ value=comp($ARG1_{GREEN,RIGHT\_LOWER\_QUADRANT}$, $ARG2_{GREEN,LEFT\_UPPER\_QUADRANT}$),
$f_{14}$ value=comp($ARG1_{BLUE,RIGHT\_LOWER\_QUADRANT}$, $ARG2_{BLUE,LEFT\_UPPER\_QUADRANT}$),
$f_{15}$ value=comp($ARG1_{RED,RIGHT\_LOWER\_QUADRANT}$, $ARG2_{GREEN,LEFT\_UPPER\_QUADRANT}$),
$f_{16}$ value=comp($ARG1_{RED,RIGHT\_LOWER\_QUADRANT}$, $ARG2_{BLUE,LEFT\_UPPER\_QUADRANT}$),
$f_{17}$ value=comp ($ARG1_{GREEN,RIGHT\_LOWER\_QUADRANT}$, $ARG2_{BLUE,LEFT\_UPPER\_QUADRANT}$),
$f_{18}$ value=comp($ARG1_{RED,LEFT\_LOWER\_QUADRANT}$, $ARG2_{RED,RIGHT\_UPPER\_QUADRANT}$), $f_{19}$ value=comp ($ARG1_{GREEN,LEFT\_LOWER\_QUADRANT}$, $ARG2_{GREEN,RIGHT\_UPPER\_QUADRANT}$),
$f_{20}$ value=comp($ARG1_{BLUE,LEFT\_LOWER\_QUADRANT}$, $ARG2_{BLUE,RIGHT\_UPPER\_QUADRANT}$), $f_{21}$ value=comp(ARG1$_{RED,LEFT\_LOWER\_QUADRANT}$, ARG2$_{GREEN,RIGHT\_UPPER\_QUADRANT}$), $f_{22}$ value=comp(ARG1$_{RED,LEFT\_LOWER\_QUADRANT}$, ARG2$_{BLUE,RIGHT\_UPPER\_QUADRANT}$), $f_{23}$ value=comp(ARG1$_{GREEN,LEFT\_LOWER\_QUADRANT}$, ARG2$_{BLUE,RIGHT\_UPPER\_QUADRANT}$).

The embodiments may in addition or alternatively calculate 4 grayscale micro-features according to the following formula, $f_{24}$ value=comp(ARG1$_{GREY,LEFT\_UPPER\_QUADRANT}$, ARG2$_{BACKGROUND,LEFT\_UPPER\_QUADRANT}$), $f_{25}$ value=comp(ARG1$_{GREY,RIGHT\_UPPER\_QUADRANT}$, ARG2$_{BACKGROUND,RIGHT\_UPPER\_QUADRANT}$), $f_{26}$ value=comp(ARG1$_{GREY,LEFT\_LOWER\_QUADRANT}$, ARG2$_{BACKGROUND,LEFT\_LOWER\_QUADRANT}$), $f_{27}$ value=comp(ARG1$_{GREY,RIGHT\_LOWER\_QUADRANT}$, ARG2$_{BACKGROUND,RIGHT\_LOWER\_QUADRANT}$).

Thereby, the BACKGROUND pixel data value is calculated as the total number of pixels in the current window multiplied by 128, and the GREY pixel data value is calculated as a third of the sum of all green, red and blue RGB-color model values of all pixels of the current window.

Figure 5:
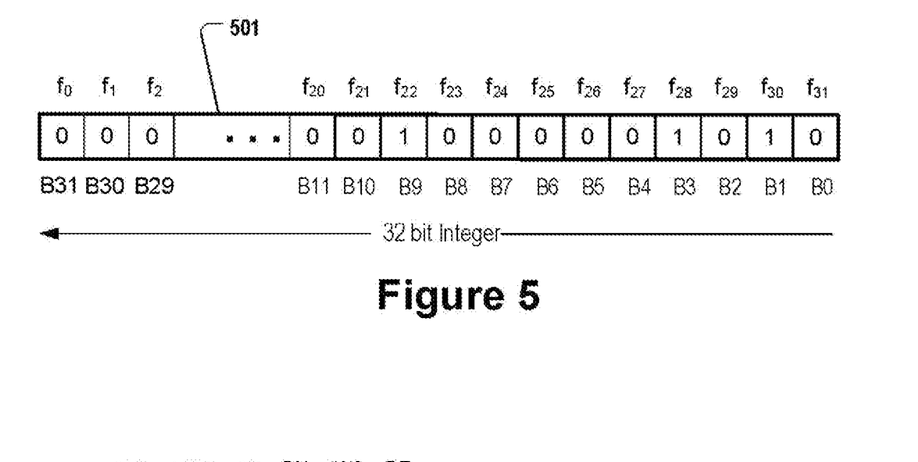
FIG. 5 depicts an example of a 32-bit integer data structure storing a combination micro-feature value

FIG. 5 depicts a 32-bit integer data structure 501 storing a combination micro-feature value. In the depicted combination feature value is a set of 32 binary micro-feature values combined to a single value. According to the depicted embodiments, 32 micro-features $f_0, \ldots, f_{31}$ are defined and a corresponding micro-feature value is calculated. The positions within the data structure 501 are indicated by the bit-labels B0, . . . , B31. For the micro-features f30, f28 and f22 a micro-feature value of '1' was obtained. For all other micro-features, the value '0' was obtained. The integer value of the depicted combination micro-feature value has the value $2^9+2^3+2^1=522$, whereby 9, 3 and 1 represent the bit-positions having stored 1-bit. When calculating a combination feature value for an arbitrary current window, and initial combination micro-feature value of '0' is assigned to each element of data structure 501. According to some embodiments, the data structure (e.g., an integer or long), is set by assigning each micro-feature a specific bit position within the integer or long. Each micro-feature corresponds to a particular position within data structure 501. After having calculated the 32 micro-feature values for the current window, each bit position in the data structure corresponding to one of the calculated micro-features is then be set if the corresponding micro-feature has the value 1. No bit-shifting is applied in said embodiments. According to other embodiments, before each micro-feature is calculated, the combination micro-feature integer (or long) is bit-shifted to the left by 1-bit. The value of one bit is then set depending on whether or not the comparison function comp is fulfilled for a particular first and second segment and for a particular first and second color. A bit is be set if the corresponding micro-feature has the value 1. Using bit shifting may be advantageous in particular if more micro-feature values are calculated as there are bit positions in the used data structure. In this case it may not be possible to assign a specific bit position to each micro-feature and bit-shifting may allow for storing different sub-sets of micro features in the data structure depending, for example, on the respective application context.

Figure 6:
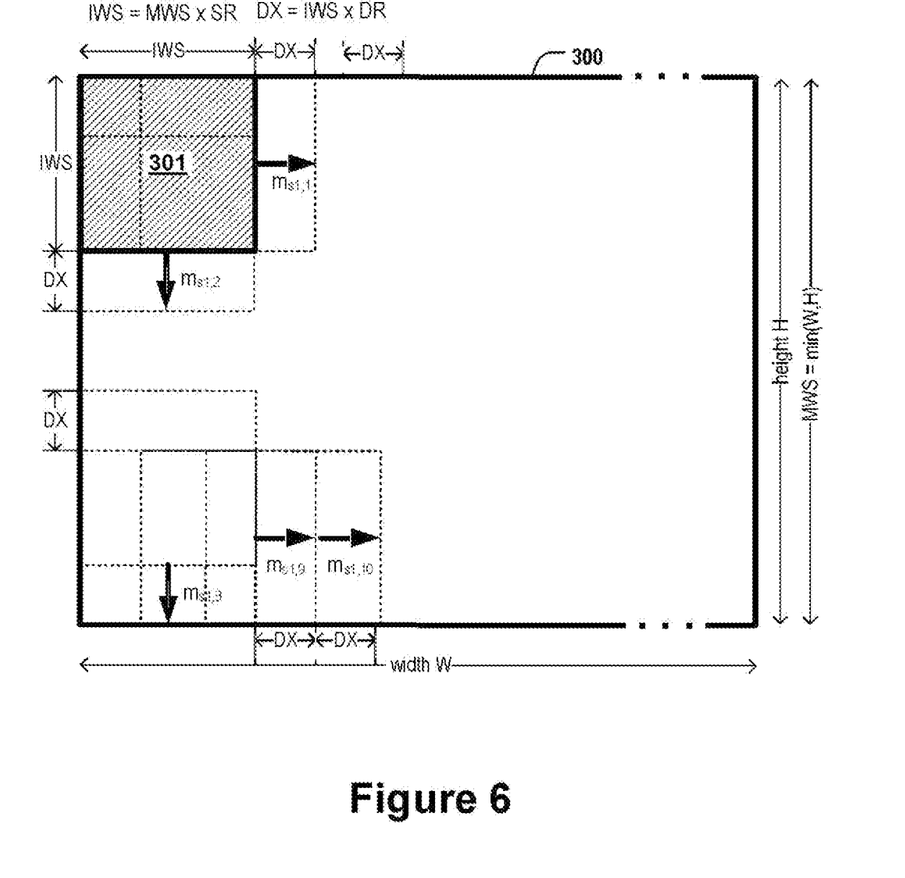
FIG. 6 depicts an example of a plurality of movement steps moving the window vertically and/or horizontally over the integral image.

FIG. 6 depicts a plurality of movement steps moving the window vertically and/or horizontally over the integral image. The initial current window 301 is located to the left upper corner of the integral image 300. The length and width of the initial current window may be referred to as IWS. In each movement step indicated by black arrows, the window is shifted by a fixed length DX in horizontal and/or vertical direction until each pixel within the integral window was covered at least once by a current window. During the movement steps $m_{s1,1}$, $m_{s1,2}$, $m_{s1,2}$, . . . , the scale of the moving window is not changed as indicated by the index "scale 1" "s1". DX is calculated by multiplying the initial window size IWS with a predefined constant DR, which can be, for example, ⅓. The initial window size IWS, again, is calculated as a proportion SR of MWS, whereby MWS is the shortest image size: MWS=min(W, H); IWS=SR×MWS, whereby SR can be, for example, 3/16.

Figure 7:
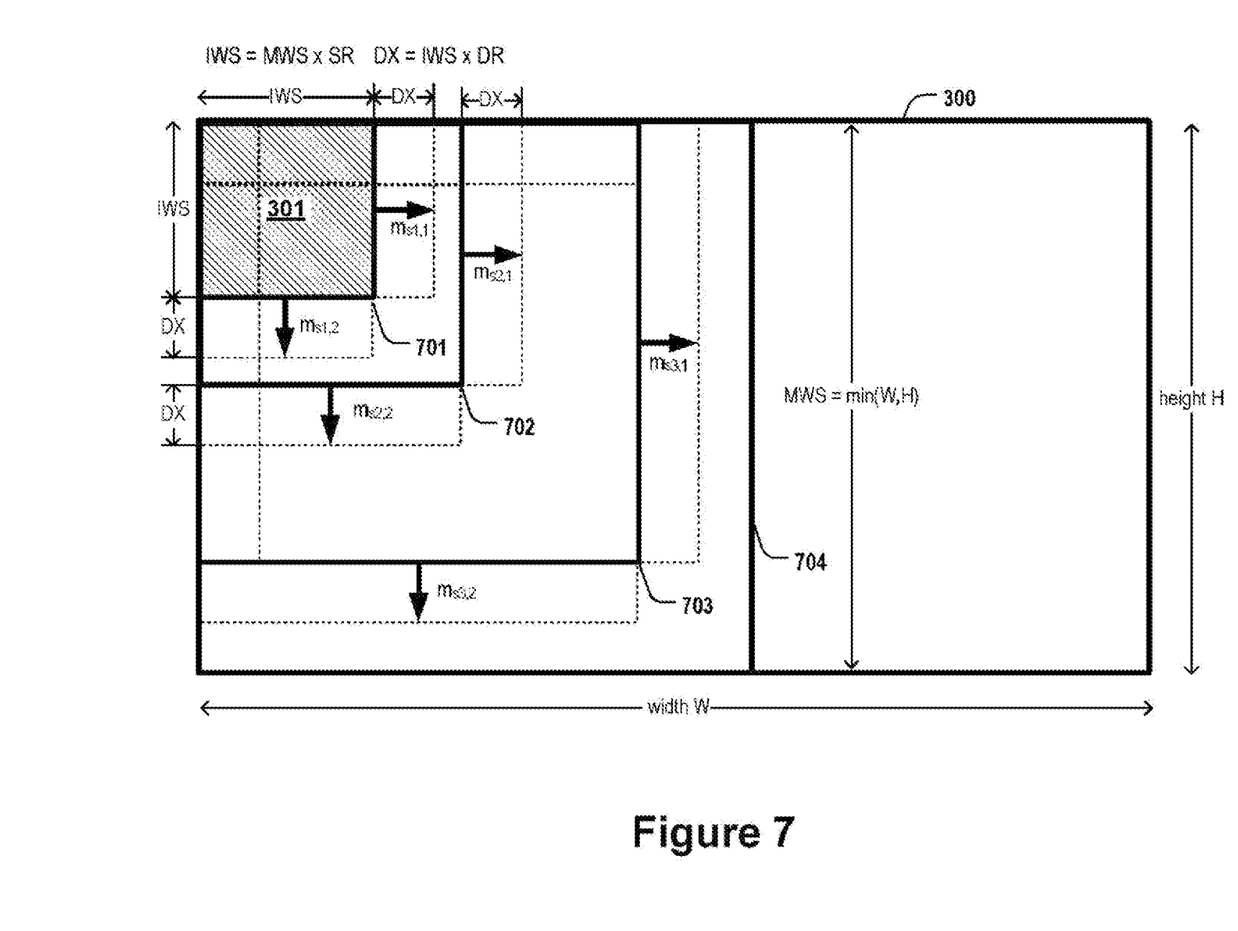
FIG. 7 depicts an example of a plurality of current windows of different scales which are to be moved over the integral image as depicted in FIG. 6.

FIG. 7 depicts a plurality of current windows of different scales 701, 702, 703 and 704 that are to be moved over the integral image. For each individual scale, the movement steps as described for FIG. 6 are executed without changing the scale of the window. At each scale transition, the new scale may be calculated by multiplying the window width and height of the window of the current scale by a scale factor SF, whereby SF may be, for example, $2^{0.25}$.

I claim:

1. A computer-implemented method of detecting one or more archive images matching a search image, each matching archive image being a derivative of the search image or being an original image the search image was derived from, the method comprising:

accessing a plurality of the archive images;

for each of said archive images, computing a respective archive image histogram, each archive image histogram comprising a plurality of combination micro-feature values, and storing said archive image histogram to a database;

receiving a search image;

computing a search image histogram from said search image, the search image histogram comprising a set of combination micro-feature values;

comparing the combination micro-feature values of the search image histogram with the combination micro-feature values of the archive image histograms to identify one or more candidate archive image histograms; and     respectively comparing the one or more candidate archive image histograms with the search image histogram to identify one or more matching archive images as being a derivative of the search image or as being the original image the search image was derived from.

2. The computer-implemented method of claim 1, wherein computing an image histogram from an image, the image being one of the archive images or being the search image, includes:

converting the image into pixel data according to a color model, wherein each pixel of the image is represented by one numerical value for each color category of the color model;

calculating an integral image from said pixel data;

moving a window over the integral image, the movement comprising a plurality of movement steps, wherein the scale of the moving window is different in at least some of the movement steps;

for each of the movement steps, using the window of the current step as current window, and:

calculating a plurality of micro-feature values from the current window, wherein each micro-feature value is a result of a comparison between a first data value derived from the pixel data of a first segment of the current window with one second data value derived from the pixel data of a second segment of the current window, the first and second segment being of equal size;

combining the plurality of micro-feature values to form one combination micro-feature value for the current window;

calculating one image histogram for the image, wherein the image histogram is calculated by:

extracting all unique combination micro-feature values from the formed combination micro-feature values; and determining an occurrence frequency for each unique combination micro-feature value within all combination micro-feature values calculated for said image, wherein the color model is an RGB color model.

3. The computer-implemented method of claim 2, wherein the current window is a square and wherein the compared first and second segments either consist of a first and a second half or a first and a second quadrant of said current window.

4. The computer-implemented method of claim 3, wherein the first and the second segments are selected from a group of first and second segments consisting of:

the upper half and the lower half of the window, the window being divided horizontally;

the left half and the right half of the window, the window being divided vertically;

the right lower quadrant and the left upper quadrant of the window, the window being divided vertically and horizontally; and the left lower quadrant and the right upper quadrant of the window, the window being divided vertically and horizontally.

5. The computer-implemented method of claim 4, wherein the color model is an RGB color model, wherein each micro-feature value is calculated by a comparing function comparing the first and the second data value, wherein the first data value is a sum of the RGB-values of a first color of all pixels of the first segment, the first color being red, green or blue, wherein the second data value is the sum of the rgb-values of a second color of all pixels of the second segment, the second color being red, green or blue, wherein at least six different micro-features are calculated based on a comparison of at least three pairs of first and second colors evaluated on at least two pairs of first and second segments, wherein said at least three pairs of first and second colors comprise:
red and red,
green and green, and
blue and blue, wherein said at least two pairs of first and second segments comprise:
right lower quadrant and left upper quadrant, and
left lower quadrant and right upper quadrant.

6. The computer-implemented method of claim 5, wherein in addition or alternatively to said at least six micro-features, at least one grey-scale micro-feature is calculated, wherein the first data value is a grey value calculated by summing up all RGB-values for the colors red, green and blue of all pixels of the first segment, and dividing said sum by three, wherein the second data value is a background value calculated by determining the number of pixels within the second segment and multiplying said number by 128, wherein each of the at least one grey-scale micro-features is calculated based on a comparison of the grey value and the background value, said comparison being executed for a pair of first and second segments being selected from the group comprising:
left upper quadrant and left upper quadrant,
right upper quadrant and right upper quadrant,
left lower quadrant and left lower quadrant, and
right lower quadrant and right lower quadrant.

7. The computer-implemented method of claim 5, wherein the comparison function for comparing the first data value (ARG1) and the second data value (ARG2) is selected from the group comprising:
ARG1>ARG2,
ARG1×c1>ARG2, wherein c1 is a constant larger than one,
ARG1×c2>ARG2, wherein c2 is a constant larger than zero and smaller than one,
ARG1+c3>ARG2, wherein c3 is a constant,
(ARG1×c1)+c3>ARG2, and
(ARG1×c2)+c3>ARG2.

8. The computer-implemented method of claim 2, wherein the window is a square and wherein the number of movement steps comprises:

specifying a proportion factor (SR), SR being a value between zero and one, specifying a shifting factor (DR), determining a variable (MWS) as a length of the shortest side of the image, determining a height and width (IWS) of an initial window as IWS=MWS×SR, a) choosing a starting point of the image as a left upper corner of the initial window, b) after having calculated combination micro-feature values for the initial window, shifting the window DX pixels one or more of horizontally and vertically until every pixel of the integral window was covered by at least one of the windows, wherein DX=IWS×DR, and wherein upon each window movement a combination micro-feature value is calculated for the corresponding current window, c) after having executed steps a) and b), increasing the height and width of the window by multiplying the IWS value of the window used previous by a scale factor SF, such that IWS'IWS×SF; and d) repeating steps a) to c) until the height and width of the increased window exceeds MWS.

9. The computer-implemented method of claim 1, wherein comparing the combination micro-feature values of the search image histogram with the combination micro-feature values of the archive image histograms comprises:

storing individual combination micro-feature values of each archive image histogram in an index of the database, the index comprising a unique set of combination micro-feature values having been calculated for said archive image, wherein each index entry references one or more identifiers of archive image histograms that comprise a combination micro-feature value being identical to the referencing index entry;

using each of the combination micro-feature values of the search image histogram as keys on said index for retrieving archive image micro-feature values being identical to said combination micro-feature value of the search image;

determining all archive image histograms referenced by said retrieved archive image micro-feature values;

assigning to each of said determined archive image histograms a count score value (CSV), said count score value being indicative of the number of retrieved archive image micro-feature values referencing the identifier of said archive image histogram; and reading all archive image histograms whose count score value exceeds a key threshold (KT) as the candidate archive image histograms.

10. The computer-implemented method of claim 9, wherein comparing the one or more candidate archive image histograms with the search image histogram comprises, for each of the candidate archive image histograms:

calculating a distance score value (DSV), the distance score value indicating a distance between the candidate archive image histogram and the search image histogram, determining all candidate archive image histograms whose distance score is lower than a distance threshold (DT), mapping the count score value to a mapped count score value (MCSV), the MCSV lying within an inclusive range of 0.5-1, wherein KM is a predefined constant representing a maximum possible CSV value in all candidate archive image histograms and wherein MCSV=0.5+min(0.5, ((CSV−KT)/(KM−KT));

mapping the distance score value to a mapped distance score value (MDSV), the MDSV lying within an inclusive range of 0.5-1, wherein DM is a predefined constant representing a maximum possible DSV value in all candidate archive image histograms and wherein MDSV=0.5+min(0.5, ((1−DSV)−(1−DT))/(DM−(1−DT)));

calculating a final score SC=(MCSV+MDSV)/2;

identifying the one or more archive images if the final score value SC exceeds a cutoff threshold.

11. The computer-implemented method of claim 1, wherein each micro-feature value combined for providing the combination micro-feature values is a zero or one value, and wherein the combination micro-feature value is stored in the form of a 32-bit integer or a 64-bit long data type in the database, whereby each micro-feature value is stored at a bit position within said data structure being particular to one type of micro-feature.

12. The computer-implemented method of claim 2, further comprising:

specifying a plurality of different reference points within the integral image, wherein one image histogram is calculated for each of said reference points, wherein creating the one image histogram for each of said reference points further includes:

determining a normalization factor (T), T being calculated as a Manhattan distance between a top left corner and a bottom left corner of the integral image, for each of the movement steps:

determining a center point Z of the current window and calculating the Manhattan distance (dRP, Z) between said center point and the reference point, and calculating a weight we=1.0−dRP, Z/T, wherein after having calculated all combination micro-feature values for said image histogram, for each of the calculated combination micro-feature values of said histogram, a weighted frequency value is calculated by summing up all weights having been calculated for the combination micro-feature values of all respective current windows of said image histogram.

13. The computer-implemented method of claim 1, wherein each of the archive image histograms is stored in the database in a form of an array, the dimension of the array being equal to a number of archive images, wherein the position number of each image histogram within said array is used as a unique identifier of said image histogram and of the corresponding image within the database, and wherein in case the plurality of different reference points were specified, each array element comprises one stacked archive histogram, and wherein the stack archive histogram is a single data structure comprising one archive image histogram for each of the number of different reference points, the stack archive histogram enabling individualization of each of its archive image histograms.

14. A computer-system comprising:

a processor, a computer-readable, non-transitory storage medium the storage medium comprising computer-interpretable instructions that, when executed by the processor, cause the processor to perform the method according to claim 1.

15. A computer-readable, non-transitory storage medium, the storage medium comprising computer-interpretable instructions that, when executed by a processor, cause the processor to perform the method according to claim 1.

* * * * *